United States Patent
Borley et al.

(10) Patent No.: US 10,169,029 B2
(45) Date of Patent: Jan. 1, 2019

(54) PATTERN BASED MIGRATION OF INTEGRATION APPLICATIONS

(71) Applicant: International Business Machines Corporation, Armonk, NY (US)

(72) Inventors: Andrew J. Borley, Blandford Forum (GB); Callum P. Jackson, Hampshire (GB); Philip L. Norton, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 15/403,071

(22) Filed: Jan. 10, 2017

(65) Prior Publication Data

US 2018/0196658 A1    Jul. 12, 2018

(51) Int. Cl.
  *G06F 8/65*   (2018.01)
  *G06F 8/70*   (2018.01)
  *G06F 8/76*   (2018.01)

(52) U.S. Cl.
  CPC .......... *G06F 8/65* (2013.01); *G06F 8/70* (2013.01); *G06F 8/76* (2013.01)

(58) Field of Classification Search
  CPC ................................................. G06F 8/76
  USPC ........................................................ 717/170
  See application file for complete search history.

(56) References Cited

U.S. PATENT DOCUMENTS

| | | | | |
|---|---|---|---|---|
| 9,841,991 B2* | 12/2017 | Sizemore | ................. | G06F 9/48 |
| 2003/0040920 A1* | 2/2003 | Adams | ................. | G06Q 10/06 |
| | | | | 705/1.1 |
| 2005/0222931 A1* | 10/2005 | Mamou | ............. | G06F 17/30563 |
| | | | | 705/35 |
| 2005/0243604 A1 | 11/2005 | Harken et al. | | |
| 2006/0242640 A1 | 10/2006 | Pauly et al. | | |
| 2007/0256058 A1* | 11/2007 | Marfatia | ................... | G06F 8/51 |
| | | | | 717/137 |
| 2009/0241100 A1* | 9/2009 | Sakurai | ............... | G06F 11/1433 |
| | | | | 717/170 |
| 2011/0107327 A1* | 5/2011 | Barkie | ...................... | G06F 8/63 |
| | | | | 717/176 |

(Continued)

OTHER PUBLICATIONS

Migration of Integration Solution, <http://www.ferrologic.se/en/referenser/migration-of-integration-solution/>, pp. 1-4.

*Primary Examiner* — Qing Chen
*Assistant Examiner* — Clint Thatcher
(74) *Attorney, Agent, or Firm* — Patterson + Sheridan, LLP (57) ABSTRACT

Systems, methods, and computer program products to perform an operation comprising obtaining configuration information from a source integration application, determining a set of features for the source integration application based on the configuration information, determining a score for a feature of the set of features for an integration pattern, the score representing based on a likelihood the feature is associated with a pattern, determining fitness scores for the integration pattern of a set of integration patterns based at least in part on the score of one or more features of the set of features, selecting one or more integration patterns from the set of patterns based on the fitness score associated with each of the integration patterns, and migrating the source integration application based on the selected one or more integration patterns.

20 Claims, 7 Drawing Sheets

(56) References Cited

U.S. PATENT DOCUMENTS

| | | | |
|---|---|---|---|
| 2012/0131567 A1* | 5/2012 | Barros | G06F 9/5088 |
| | | | 717/170 |
| 2012/0296862 A1 | 11/2012 | Duda et al. | |
| 2014/0282456 A1* | 9/2014 | Drost | G06F 8/76 |
| | | | 717/158 |
| 2015/0082290 A1* | 3/2015 | Peled | G06F 8/51 |
| | | | 717/137 |
| 2017/0192777 A1* | 7/2017 | Apte | G06F 8/76 |
| 2018/0081740 A1* | 3/2018 | Syed | G06F 8/76 |

* cited by examiner

| Patterns: | Gateway | Service Selector | Service Translator | ... |
|---|---|---|---|---|
| Source Components and Connections: | | | | |
| Export | 100 | 100 | 100 | ... |
| Endpoint Lookup | 80 | 50 | 30 | ... |
| Routing | 40 | 100 | 30 | ... |
| Import | 80 | 90 | 100 | ... |
| Transformation | 20 | 20 | 100 | ... |
| Export connects to Endpoint Lookup | 100 | 50 | 20 | ... |
| Endpoint Lookup connects to Import | 90 | 50 | 20 | ... |
| Export connects to Routing | 50 | 100 | 30 | ... |
| Routing connects to Import | 50 | 100 | 30 | ... |
| Export connects to Transformation | 20 | 20 | 100 | ... |
| Transformation connects to Import | 20 | 20 | 100 | ... |
| ... | ... | ... | ... | ... |

PATTERN BASED MIGRATION OF INTEGRATION APPLICATIONS

BACKGROUND

The present disclosure relates to migrating integration applications, and more specifically, to pattern based migrations of integration applications.

Generally organizations rely on multiple software applications for business operations. Integration applications generally are applications that help tie these multiple software applications together for ease of management and to interoperate together, for example, by importing or exporting data, performing data transformations, or routing data among the various software applications.

Products such as IBM Integration Bus (IBM and Integration Bus are trademarks of International Business Machines Corporation) provide options for a universal integration foundation based on enterprise service bus (ESB) technology. Implementations help to enable connectivity and transformation in heterogeneous information technology environments for businesses of any size, in any industry and covering a range of platforms including cloud environments and mainframe servers.

Integration applications help enable organizations to leverage cloud technologies and scale elastically to elastically to cope with demand, reduce and rationalize information technology infrastructure, reduce cost of operations and deploy systems faster, easier and on-demand. Additionally, integration applications may help enable applications or services operate in a hybrid cloud environment where some processing is performed in a public cloud space and some processing that may be using secure data, is run on premise within the firewall.

Organizations using integration applications may need to upgrade or migrate their integration applications between versions or between vendors. These upgrade or migration scenarios can be challenging as the integration applications can interoperate with a large number of other applications or services. Addressing these complexities currently requires a deep understanding of not only both the previous and next integration applications and other applications, but also the intent of the original integration solution.

SUMMARY

According to one embodiment of the present disclosure, a method for migrating applications, the method comprises obtaining configuration information from a source integration application, determining a set of features for the source integration application based on the configuration information, determining a score for a feature of the set of features for an integration pattern, the score representing based on a likelihood the feature is associated with a pattern, determining fitness scores for the integration pattern of a set of integration patterns based at least in part on the score of one or more features of the set of features, selecting one or more integration patterns from the set of patterns based on the fitness score associated with each of the integration patterns, and migrating the source integration application based on the selected one or more integration patterns.

According to another embodiment of the present disclosure, a system comprises a processor and a memory including a program which when executed by the processor, performs an operation comprising obtaining configuration information from a source integration application, determining a set of features for the source integration application based on the configuration information, determining a score for a feature of the set of features for an integration pattern, the score representing based on a likelihood the feature is associated with a pattern, determining fitness scores for the integration pattern of a set of integration patterns based at least in part on the score of one or more features of the set of features, selecting one or more integration patterns from the set of patterns based on the fitness score associated with each of the integration patterns, and migrating the source integration application based on the selected one or more integration patterns.

According to another embodiment of the present disclosure, a computer program product comprises a computer-readable storage medium having computer-readable program code embodied therewith, the computer-readable program code executable by one or more computer processors to perform an operation comprising obtaining configuration information from a source integration application, determining a set of features for the source integration application based on the configuration information, determining a score for a feature of the set of features for an integration pattern, the score representing based on a likelihood the feature is associated with a pattern, determining fitness scores for the integration pattern of a set of integration patterns based at least in part on the score of one or more features of the set of features, selecting one or more integration patterns from the set of patterns based on the fitness score associated with each of the integration patterns, and migrating the source integration application based on the selected one or more integration patterns.

DETAILED DESCRIPTION

Embodiments disclosed herein are directed to automatic integration application migration using integration intentions. Organizations generally rely on many disparate business applications and integration applications help enable these applications interact and work together. For example, information may be required to flow between disparate business applications across multiple hardware and software platforms. An integration application may act as a message based system, receiving a message from a first business application via some form of transport, performing a transform on the message, and pushing the message to a second business application, potentially via a different form of transport.

One architecture which supports this is Enterprise Service Bus architecture providing integrated connectivity between applications and services in a service-oriented architecture. IBM Integration Bus (formerly Web Sphere Message Broker, wherein IBM and WebSphere are trademarks of International Business Machines Corporation) is an example of such an architecture, which allows business information to flow as an integration application with rules applied to the data going through an integration node (also referred to as a message broker) to route and transform the information.

As integration applications help integrate a variety of business applications together as a cohesive solution, migrating an integration application from an original integration solution to a new integration application can be a complex process. This migration process often requires a deep understanding of not only the integration application, but also the business applications being integrated together and the intent of the process performed by the original integration application. In other words, a successful upgrade or migration should take into account why a particular process was performed as between the business applications in the original integration solution.

Currently, migrations of complex integration solutions require an experienced integration engineer to perform as existing migration tools are generally insufficient. For example, existing integration applications generally take a black-box approach to migration. For example, existing solutions may observe network traffic, file system operations, etc., of an existing solution to produce an abstract model of the existing solution being migrated. This model may then be implemented by the new solution. However, such a model-based system is unlikely to succeed for moderately complex integration solutions, as the potential inputs and outputs lead to an unworkably large combinatorial matrix of integration logic.

Existing integration applications, as a part of setting up a new integration solution, offer templates for various integration patters as step in a development path. These templates can greatly simply development of an integration solution as following a defined development path and providing a few choices and pieces of information may be all that is required to generate an integration solution based on that template pattern. This template pattern may then be modified with required artifacts and structures as needed and starting with such a template pattern may be much quicker than starting from a blank integration application.

Artifacts and structures may describe components and connections between various components of a service. An artifact may be the pieces of information that configure the source application, such as one described in a web services description language (WSDL) and within those pieces of information are structures which perform various functions, such as converting or passing on information. For example, an XML-based interface definition language such as WSDL may be used to describe the functionality such as a routing functionality between two endpoints, where the endpoint information are structures which together for an artifact defining the routing functionality. For example, a pattern based approach to integration application migration may also be used where a pattern is selected based on an evaluation of the artifacts and structures in an integration solution being migrated from a source application to a target application. Advantageously, embodiments described herein provide techniques for assisting migrations by utilizing pattern-based migration of integration applications. A pattern based migration, rather than performing a blind conversion, determines an intention of the source application and crafts a tailored integration solution addressing the intention embodied in the source application.

As used herein, an "application" may refer to any executable program code, such as a job, workload, service, task, script, and the like, and may be of any suitable format, such as a binary file, executable, installer package, image, and the like.

Figure 1:
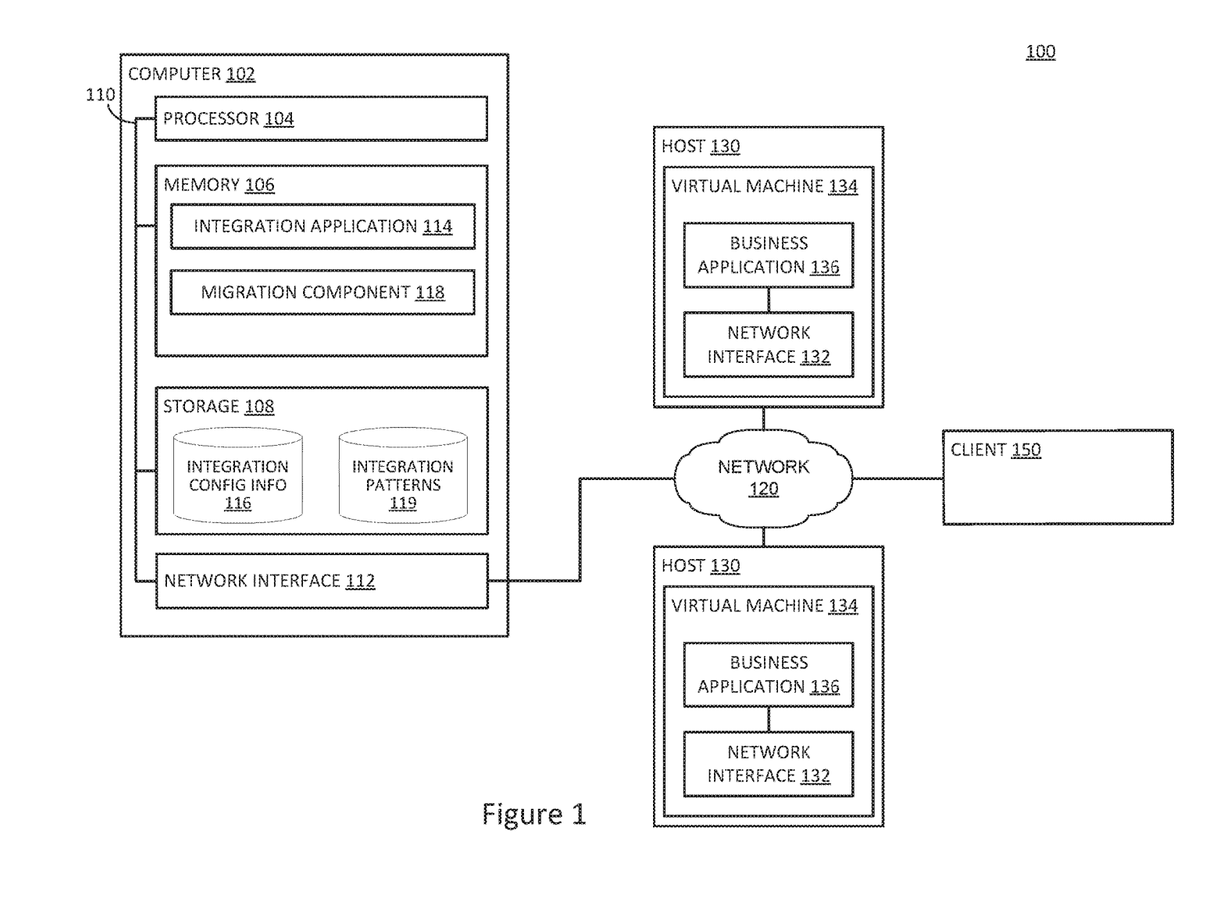
FIG. 1 an integration application environment configured to enable pattern based migration of integration applications, according to aspects of the present disclosure.

FIG. 1 illustrates an integration application environment 100 configured to enable pattern based migration of integration applications, according to aspects of the present disclosure. The integration application environment 100 includes a computer 102. The computer 102 may also be connected to other computers (e.g. hosts) via a network 120. In general, the network 120 may be a telecommunications network and/or a wide area network (WAN). In a particular embodiment, the network 120 is the Internet.

The computer 102 generally includes a processor 104 which obtains instructions and data via a bus 110 from a memory 106 and/or a storage 108. The computer 102 may also include one or more network interface devices 112 connected to the bus 110. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The processor may execute an integration application 114 in memory 106. The network interface 112 may be any type of network communications device allowing the computer 102 to communicate with other computers via the network 120. The network interface 112 may exchange messages with the network 120. In certain implementations, the computer 102 may be an instance of a virtual machine running within another computer (not shown). Computer 102 may also be networked with other computers also executing the integration application where the multiple instances of the integration application on the multiple computers operate cooperatively.

The storage 108 is representative of hard-disk drives, solid state drives, flash memory devices, optical media, and the like. Storage 108 may also include structured storage, for example a database. Generally, the storage 108 stores integration configuration info 116 for use by integration application 114. The integration configuration information contains information used to configure the integration application 114, for example, defining how a data may be imported from a particular service, transformed via data transformations, and then exported to another service. In addition, the memory 106 and the storage 108 may be considered to include memory physically located elsewhere; for example, on another computer coupled to the computer 102 via the bus 110 or network 120.

According to aspects of the present disclosure, the computer 102 may be one or more servers operating as a part of a server cluster. For example, computer 102 may operate as an application server and may communicate with or in conjunction with other frontend, application, backend, data repository, or other type of server.

The hosts 130 are compute nodes configured to execute one or more business applications 136. The hosts 130 may include a network interface 132 through which the business applications 136 may utilize for communications. Generally, business applications 136 may be deployed in any suitable configuration. For example, business applications 136 may execute on computer 102 as a process, or within the context of a virtual machine executing on computer 102. As another example, multiple business applications 136 may execute on a single compute node, separate from computer 102. As shown, business applications 136 executes on multiple hosts 130 in the context of virtual machines 134, which are separate from computer 102.

One or more client 150 compute nodes may access the business applications 136, for example through an internet browser or other application via the network 120. The client 150 may issue various requests to the business applications 136, for example utilizing standard protocols such as HTTP, AJAX, etc.

Migration of a source integration solution may be performed using a pattern-based approach to application development. For example, an organization having an existing integration application 114 installed and running on computer 102 may desire to upgrade the existing integration application 114, i.e., a source integration application, to a target integration application. To perform the migration, an administrator of the computer 102 may install the target integration application on computer 102 and execute a migration component 118 in memory 106 for migrating the source integration application to the target integration application using the pattern-based approach. The migration component utilizes integration patterns 119 stored in storage 108 as a part of migrating the source application. This program may be contained or triggered by an installer program for the target integration application. In certain cases, the target integration application may be installed on a second computer, or virtual machine, which is not executing the existing integration application 114. This second computer may then connect, for example via network 120 to a shared network drive also connected to computer 102 and migrate the source integration application to the target integration application using the pattern-based approach.

A pattern based migration component evaluates the source application to determine an intention of the source application and migrates the source application to the target application based on this intention, rather than attempting to do a one-to-one mapping conversion migration from the source application. The pattern-based migration component may examine the existing source integration solution and evaluate the artifacts and structures in the source integration solution. This evaluation of the source integration solution may be used to generate, based on scores associated with the features of the source integration solution, a fitness score of how closely the source integration solution matches to each of a set of integration patterns. Each integration pattern in a target integration application defines a set of expected characteristics of a source application. An integration pattern or set of integration patterns may then be selected based on the fitness score and the migration component may extract, from the source integration solution, information for populating the integration pattern of the target integration application.

As an example, a source integration solution may implement a service proxy virtualization pattern. The service proxy pattern is a pattern which takes an existing service and deploys a virtual service, enabling the existing service to be accessed through a controlled point of accessibility and functions as a mediation point, allowing for protocol conversion, enhanced security configurations, logging, error handling, etc., that may not be available using the existing service.

Figure 2:
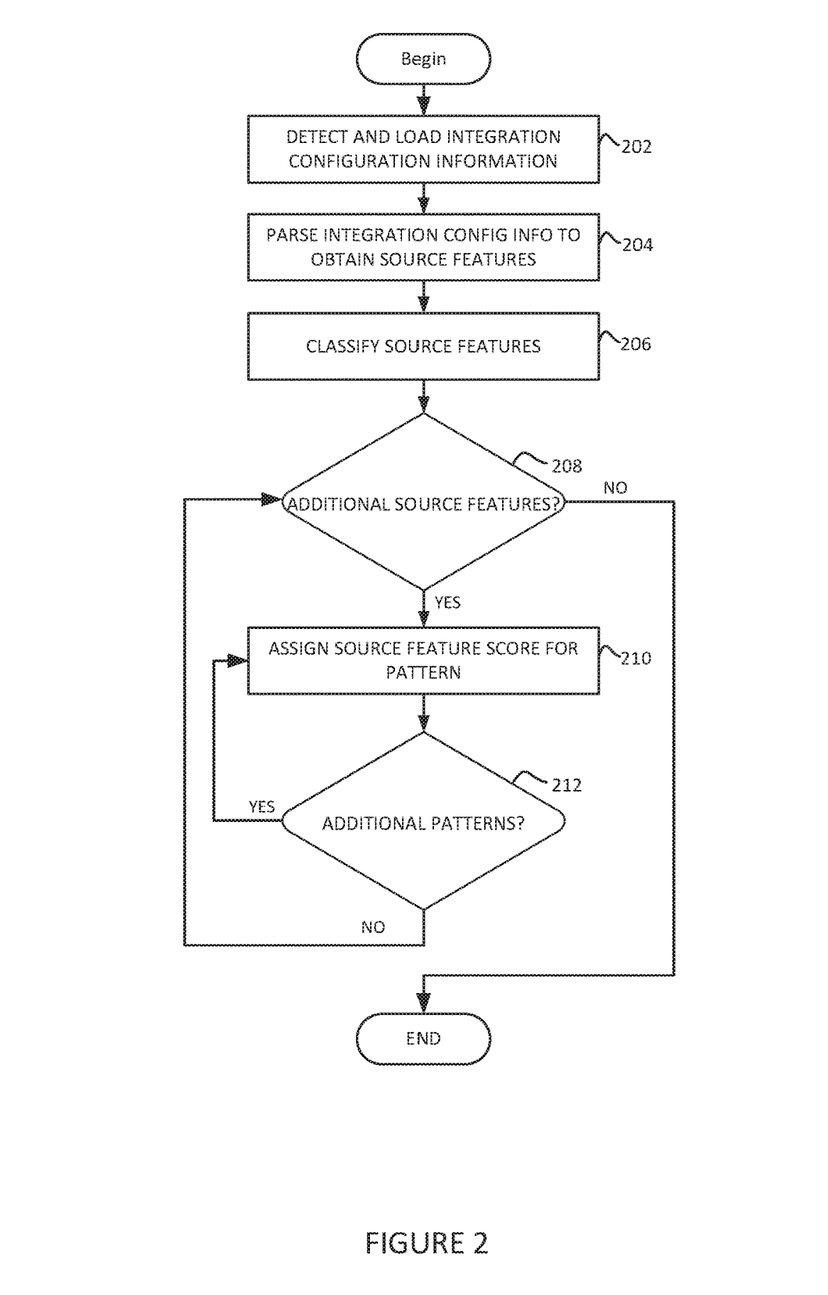
FIG. 2 is a flow chart illustrating a method for pattern based migration of an integration application, in accordance with aspects of the present disclosure.

FIG. 2 is a flow chart 200 illustrating a method for assigning features scores, in accordance with aspects of the present disclosure. At block 202, a migration component, for example migration component 118 of FIG. 1, may detect and load integration configuration information from the source integration application. For example, the migration component may be configured with information related to a set of supported source integration applications for migration. The migration component may search, for example, a registry or file structure for indications that a particular source integration application of the set of possible integration applications is available for migration. Alternatively or in addition, the migration component may receive input from an administrator indicating a source integration application. Similarly, the migration component may also locate the integration configuration information in the storage based on, for example, known locations within the storage for a given integration application, a search of the registry or file system, or via information received from an administrator.

At block 204, the migration component obtains configuration information, for example, by parsing artifacts and structures from the source integration solution. Continuing with the above example, the migration component may parse the stored integration configuration information to obtain configuration information. For example, the integration configuration information may be contained in an XML based file which may be traversed by the migration component. The migration component may be configured to parse integration configuration information used by the set of supported source integration applications. A specific source integration application may be detected previously at 202, and the migration component, based on this detection, utilizes a particular parser for parsing the integration configuration information to obtain the artifacts and structures of the integration configuration information. For example, the migration component may detect a source integration application App1 is being migrated. The migration component may be configured to read and parse the integration configuration information of App1 such that upon encountering a scheme indicating <endpoint name="Endpoint1". . . />, the migration component understands and corresponds the information contained in the scheme with an endpoint structure.

At block 206, the migration component, classifies the artifacts and structures into features of the source integration application. For example, a pair of associated endpoints in the integration configuration may be classified as a routing connection feature. In another example, the migration component may obtain the configuration information and determine that the source integration solution contains endpoints for a web service associated with a lookup of an endpoint address for a service provider and determine that the source integration solution contains a web service input feature to receive messages along with an endpoint lookup feature.

At block 208, the migration component loops through the classified source features. Where there are source features, at 210, a feature score may be assigned to the source feature for a pattern of a catalog of predefined patterns. Generally, there is a finite set of typical usage patterns for integration services and each pattern may be typically associated with certain source features, where these features are likely to be used with the pattern. A particular source feature may matched against a known list of source features for a pattern in a scoring table and a source feature score may be assigned to the particular source feature for the pattern. For example, a lookup of an endpoint address feature may have an associated feature score for a gateway pattern. This feature score may be assigned to the endpoint address feature for the gateway pattern. At 212, the migration component loops through the patterns and where there is an additional pattern, feature scores are assigned to the source feature for the additional pattern at block 210. For example, the lookup may also have a feature score assigned for a service selector patter, which is lower than the score assigned for the gateway pattern. The variation in the feature score across patterns may be based on a likelihood of whether a particular source feature is associated with a particular pattern. This score may be provided by, for example, an expert in the source integration solution, or by automatically assessing the contents of a training set of known and categorized integration applications.

Figure 3:
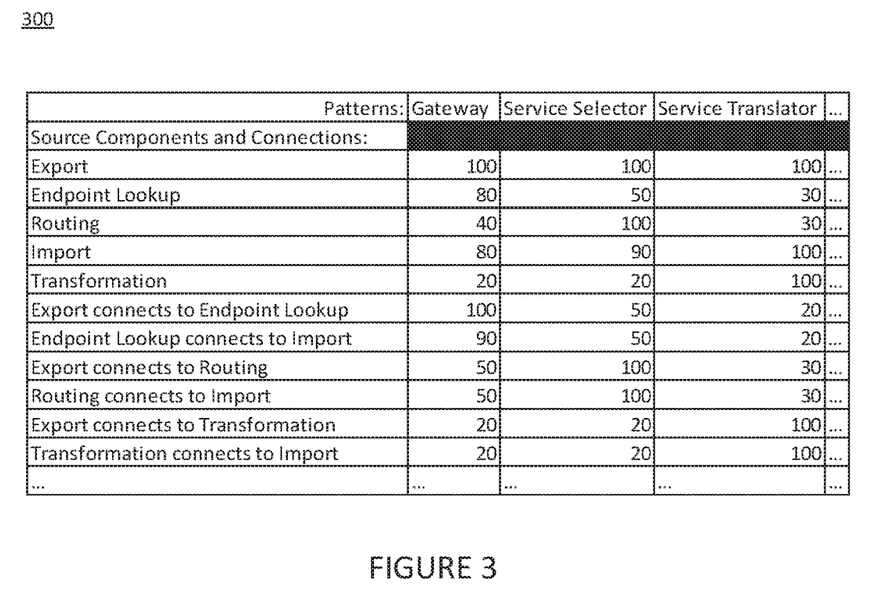
FIG. 3 illustrates an example scoring table, in accordance with aspects of the present disclosure.

FIG. 3 illustrates an example scoring table 300, in accordance with aspects of the present disclosure. As described in conjunction with step 210 of FIG. 2, a scoring table may include a set of source features along with a set of patterns. For each source feature and a particular pattern, a score is defined. A score associated with a feature may be different for each pattern. For example, an endpoint lookup which connects to an import may be typically associated with a gateway pattern and have a score of 90 with respect to the gateway pattern. However, such a connection may not be typically associated with a service selector pattern and thus has a score of 50 with respect to the service selector pattern. Additionally, properties for particular source feature may also be scored in the scoring table. For example, a particular type of connection over a particular port may score higher with a certain pattern than another type of connection on another port. Once source features from the source integration application are matched against features in the scoring table, scores for each match may be summed for each pattern to create a fitness score for each target pattern.

Figure 4:
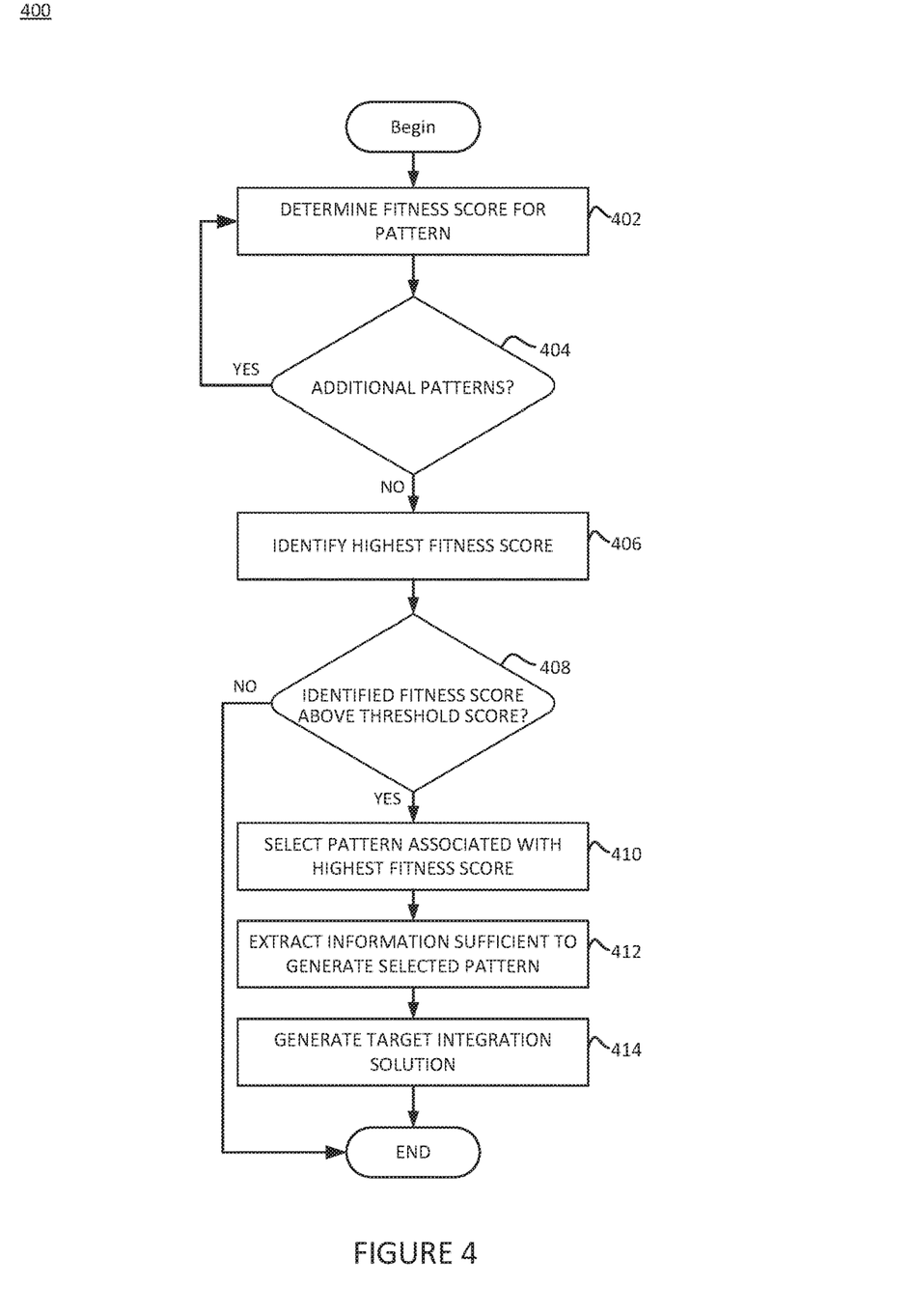
FIG. 4 illustrates an example method for determining a fitness score, in accordance with aspects of the present disclosure.

FIG. 4 illustrates an example method 400 for determining a fitness score, in accordance with aspects of the present disclosure. At block 402, the migration component may then determine, based on a totality of the feature scores for a pattern, a fitness score for the pattern in the catalog. The migration component may total the feature score of the features associated with a particular target pattern and generate a fitness score for the particular target pattern in the catalog. At block 404, if additional patterns are not found, execution proceeds to block 406 which identifies the pattern associated with the highest fitness score. For example, a source integration application having both a web service input and output, as well as a mechanism to lookup addresses and route messages to an endpoint based on such a lookup would have a relatively high fitness score based on the individual feature scores for the service proxy pattern, but a relatively low fitness score for a service facade pattern. Another source integration application having a web service input, but a message queue (MQ) protocol output and no lookup mechanism would have a relatively low fitness score for the service proxy pattern but a relatively higher fitness score for a service facade pattern. The highest fitness score as between the service proxy pattern and service facade pattern would be determined and the pattern associated with the highest score is identified.

At block 408, the highest fitness score is compared against a threshold score and if the highest fitness score exceeds the threshold score, the pattern associated with the highest fitness score is selected for implementation at block 410. If the highest fitness score does not exceed the threshold, the migration component may return an error.

At block 412, information sufficient to generate the selected pattern is extracted from the source integration solution. For example, the web service input and output, as well as database access properties from the endpoint address lookup mechanism, may be extracted from the WSDL artifacts from the source integration solution using APIs or data files associated with the source integration solution. At block 414, this information is inputted into the selected pattern to generate a target integration solution that matches the intention of the original integration application. For example, properties of source features may be mapped to the properties required by each selected pattern, such as routing rules, transformation rules, mapping logic, and endpoint URLs.

According to aspects of the present disclosure, multiple patterns may be selected. For example, all patterns associated with a fitness score above a certain threshold score may be selected for implementation. Where multiple patterns are selected, a set of potential target integration solutions may be implemented and presented to a user. The user may then, for example, select from the set of integration solutions for implementation or modification.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
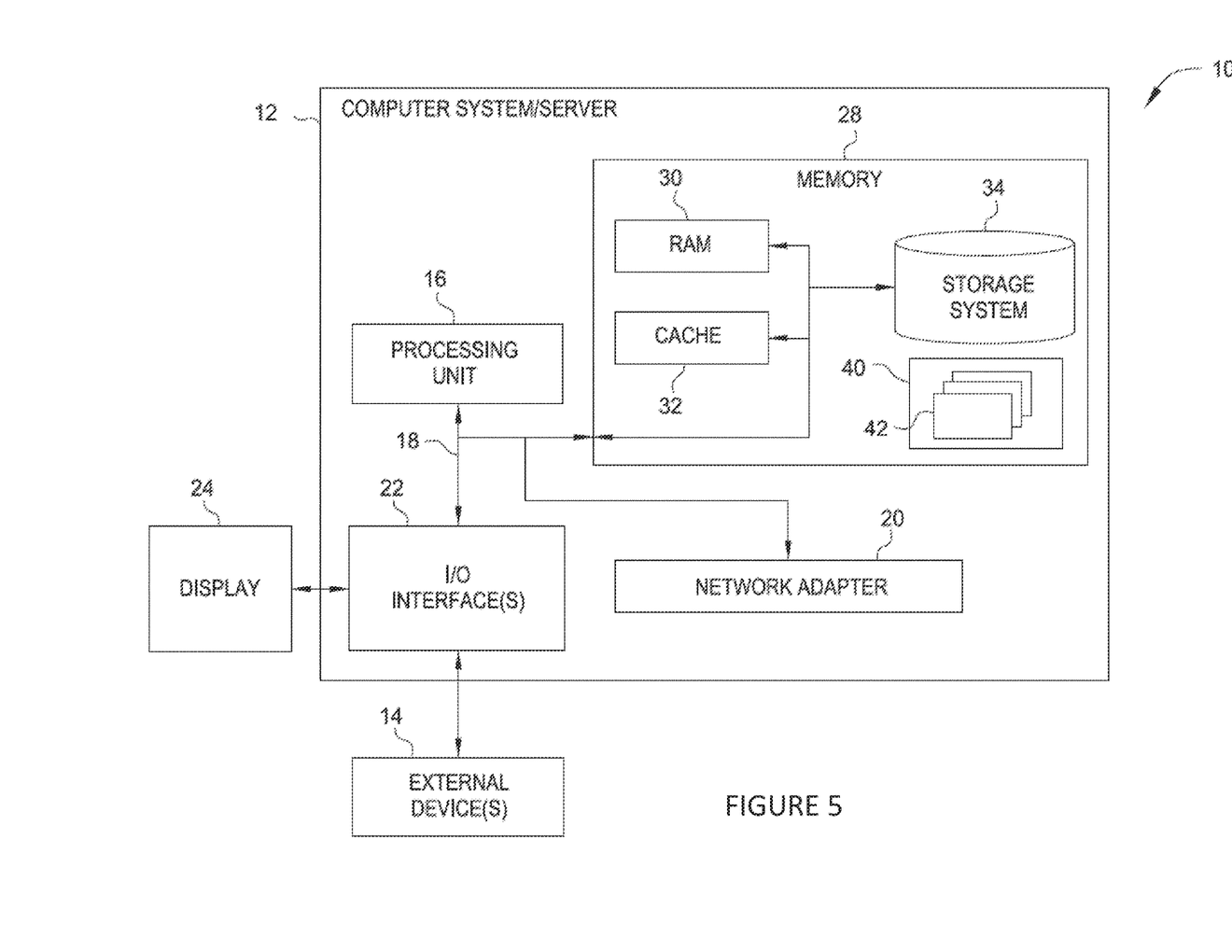
FIG. 5 depicts a cloud computing node according to one embodiment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
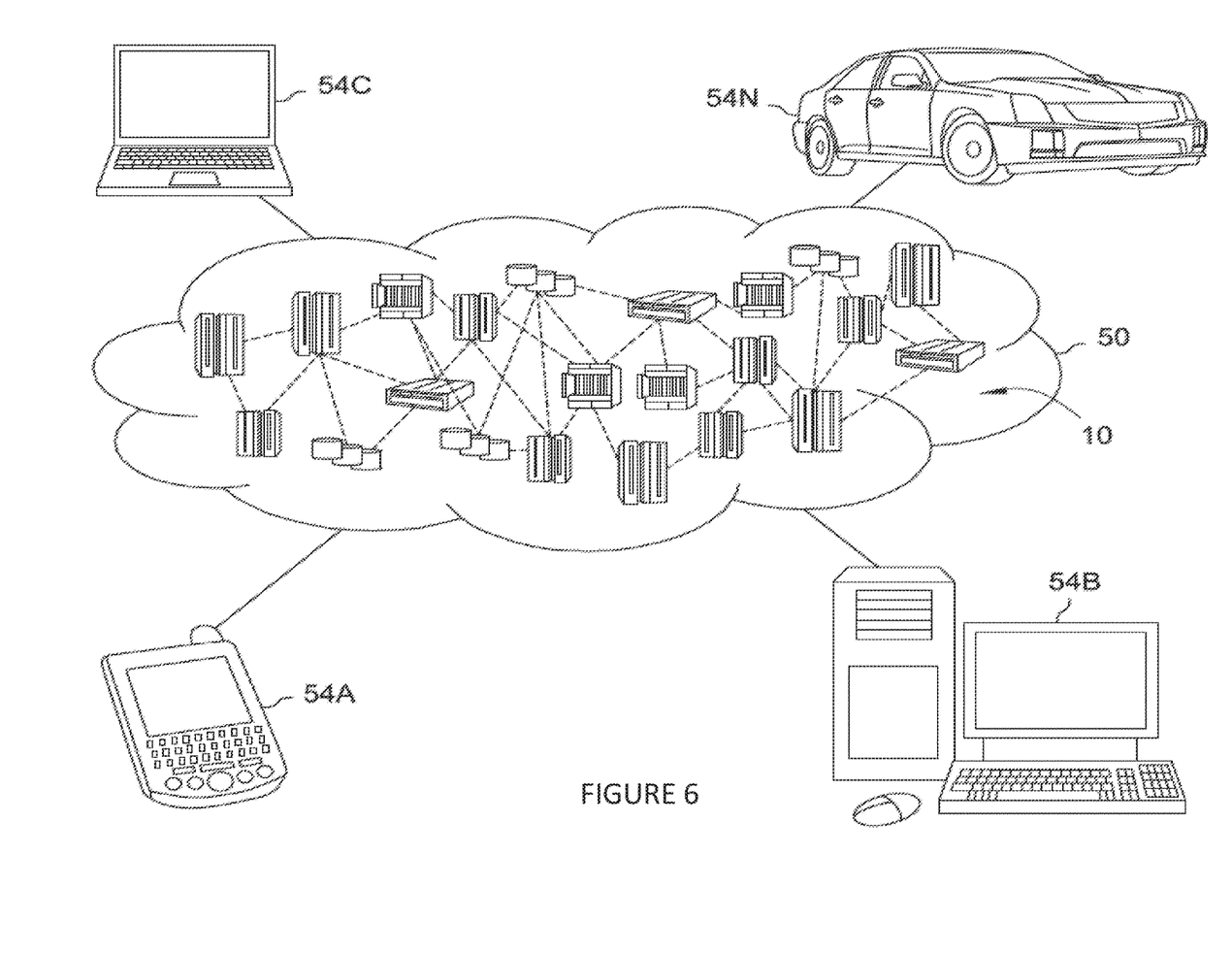
FIG. 6 depicts a cloud computing environment according to one embodiment.
Figure 7:
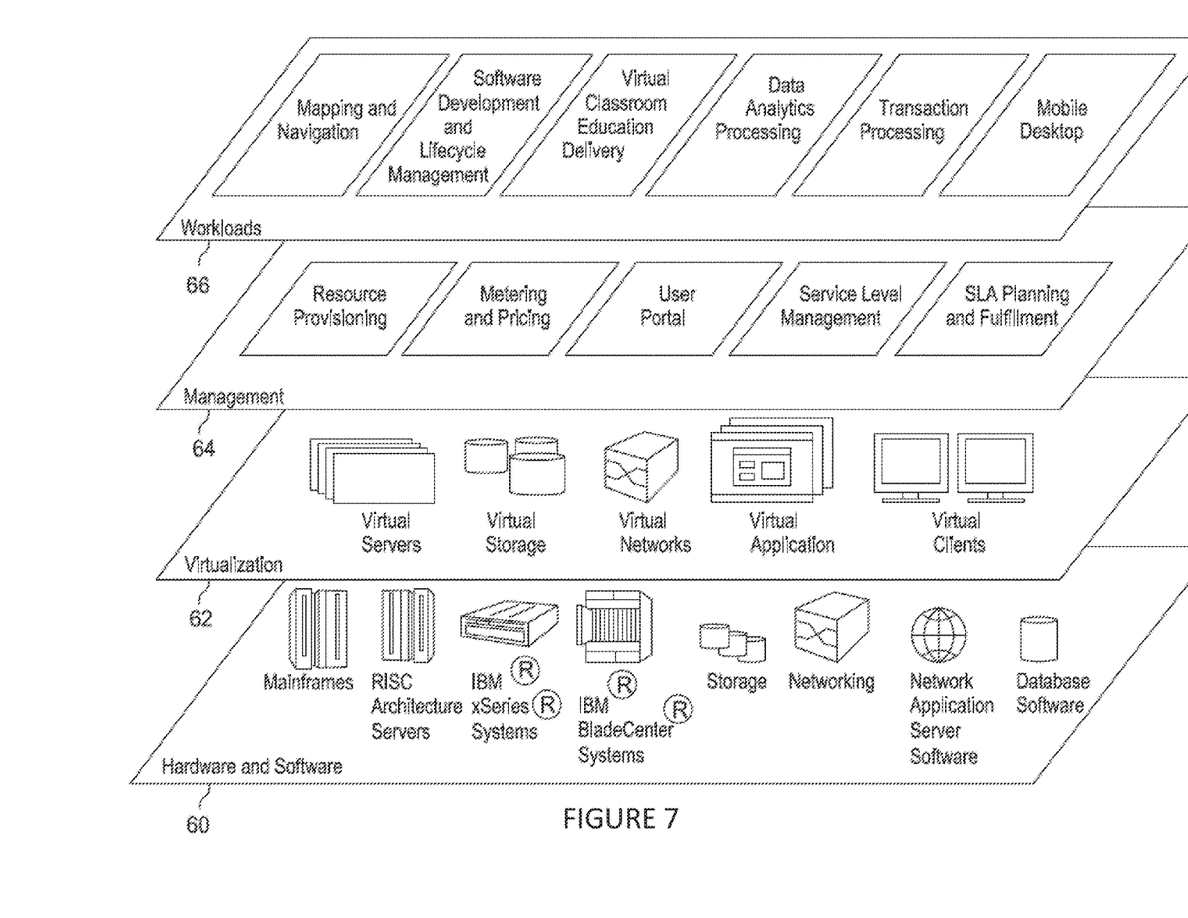
FIG. 7 depicts abstraction model layers according to one embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for migrating applications, the method comprising:
   obtaining configuration information from a source integration application;
   determining a set of features for the source integration application based on the configuration information;
   identifying a set of integration patterns, wherein each integration pattern in the set of integration patterns defines a set of expected characteristics;
   determining a respective fitness score for each of the set of integration patterns by, for each respective integration pattern of the set of integration patterns:
      determining a respective feature score for at least two respective features of the set of features, wherein each of the respective feature scores represent a likelihood that the respective feature matches the respective integration pattern; and
      aggregating the respective feature scores to generate the respective fitness score for the respective integration pattern;
   selecting one or more integration patterns from the set of integration patterns based on the respective fitness score associated with each of the respective integration patterns; and
   migrating the source integration application based on the selected one or more integration patterns.

2. The method of claim 1, wherein aggregating the respective feature scores to generate the respective fitness score for the respective integration pattern comprises summing the respective feature scores for the respective integration pattern.

3. The method of claim 1, wherein the feature score for a first feature of the set of features has a first value for a first integration pattern and a second value for a second integration pattern, wherein the first value and the second value are different.

4. The method of claim 3, wherein the first value for the feature score is determined based on whether the feature is typically associated with the first integration pattern, and wherein the second value for the feature score is determined based on whether the first feature is typically associated with the second integration pattern.

5. The method of claim 3, wherein each feature score for the first integration pattern has a pre-determined value.

6. The method of claim 1, wherein the selected one or more integration patterns are selected based on determining that the respective fitness score of the one or more integration patterns exceeds a threshold score.

7. The method of claim 1, wherein a first and a second integration patterns are selected, and wherein migrating the source integration applications comprises:
   migrating the source integration application based on the first integration pattern;
   migrating the source integration application based on the second integration pattern; and
   receiving a selection of either the first or the second integration pattern.

8. A system for migrating applications, the system comprising:
   one or more computer processors;
   a memory containing a program which when executed by the one or more computer processors performs an operation, the operation comprising:
      obtaining configuration information from a source integration application;
      determining a set of features for the source integration application based on the configuration information;
      identifying a set of integration patterns, wherein each integration pattern in the set of integration patterns defines a set of expected characteristics;
      determining a respective fitness score for each of the set of integration patterns by, for each respective integration pattern of the set of integration patterns:
         determining a respective feature score for at least two respective features of the set of features, wherein each of the respective feature scores represent a likelihood that the respective feature matches the respective integration pattern; and
         aggregating the respective feature scores to generate the respective fitness score for the respective integration pattern;
      selecting one or more integration patterns from the set of integration patterns based on the respective fitness score associated with each of the respective integration patterns; and
      migrating the source integration application based on the selected one or more integration patterns.

9. The system of claim 8, wherein aggregating the respective feature scores to generate the respective fitness score for the respective integration pattern comprises summing the respective feature scores for the respective integration pattern.

10. The system of claim 8, wherein the feature score for a first feature of the set of features has a first value for a first integration pattern and a second value for a second integration pattern, wherein the first value and the second value are different.

11. The system of claim 10, wherein the first value for the feature score is determined based on whether the first feature is typically associated with the first integration pattern, and wherein the second value for the feature score is determined based on whether the first feature is typically associated with the second integration pattern.

12. The system of claim 10, wherein each feature score for the first integration pattern has a pre-determined value.

13. The system of claim 8, wherein the selected one or more integration patterns are selected based on determining that the respective fitness score of the one or more integration patterns exceeds than a threshold score.

14. The system of claim 8, wherein a first and a second integration patterns are selected, and wherein migrating the source integration applications comprises:
   migrating the source integration application based on the first integration pattern;
   migrating the source integration application based on the second integration pattern; and
   receiving a selection of either the first or the second integration pattern.

15. A computer program product comprising:
a computer readable storage medium having computer-readable program code embodied therewith, the computer-readable program code for migrating applications, comprising:
computer-readable program code configured to:
   obtain configuration information from a source integration application;
   determine a set of features for the source integration application based on the configuration information;
   identifying a set of integration patterns, wherein each integration pattern in the set of integration patterns defines a set of expected characteristics;
   determine a respective fitness score for each of the set of integration patterns by, for each respective integration pattern of the set of integration patterns:
      determining a respective feature score for at least two respective features of the set of features, wherein each of the respective feature scores represent a likelihood that the respective feature matches the respective integration pattern; and
      aggregating the respective feature scores to generate the respective fitness score for the respective integration pattern;
   select one or more integration patterns from the set of integration patterns based on the respective fitness score associated with each of the respective integration patterns; and
   migrate the source integration application based on the selected one or more integration patterns.

16. The computer program product of claim 15, wherein aggregating the respective feature scores to generate the respective fitness score for the respective integration pattern comprises summing the respective feature scores for the respective integration pattern.

17. The computer program product of claim 15, wherein the feature score for a first feature of the set of features has a first value for a first integration pattern and a second value for a second integration pattern, wherein the first value and the second value are different.

18. The computer program product of claim 17, wherein the first value for the feature score is determined based on whether the first feature is typically associated with the first integration pattern, and wherein the second value for the feature score is determined based on whether the first feature is typically associated with the second integration pattern.

19. The computer program product of claim 17, wherein each feature score for the first integration pattern has a pre-determined value.

20. The computer program product of claim 15, wherein the selected one or more integration patterns are selected based on determining that the respective fitness score of the one or more integration patterns exceeds a threshold score.

* * * * *